United States Patent
Huffman et al.

(10) Patent No.: US 6,839,820 B1
(45) Date of Patent: Jan. 4, 2005

(54) METHOD AND SYSTEM FOR CONTROLLING DATA ACCESS BETWEEN AT LEAST TWO MEMORY ARRANGEMENTS

(75) Inventors: William A. Huffman, Los Gatos, CA (US); Randal S. Passint, Chippewa Falls, WI (US)

(73) Assignee: Silicon Graphics, Inc., Mountain View, CA (US)

( * ) Notice: Subject to any disclaimer, the term of this patent is extended or adjusted under 35 U.S.C. 154(b) by 632 days.

(21) Appl. No.: 09/910,395

(22) Filed: Jul. 20, 2001

Related U.S. Application Data
(60) Provisional application No. 60/219,948, filed on Jul. 20, 2000.

(51) Int. Cl.[7] .............................................. G06F 12/00
(52) U.S. Cl. ...................................... 711/163; 711/157
(58) Field of Search ................................. 711/163, 157

(56) References Cited

U.S. PATENT DOCUMENTS

| | | | | |
|---|---|---|---|---|
| 4,964,037 A | * | 10/1990 | Woods et al. | 711/157 |
| 5,051,889 A | * | 9/1991 | Fung et al. | 711/157 |
| 6,446,158 B1 | * | 9/2002 | Karabatsos | 711/5 |
| 6,625,685 B1 | * | 9/2003 | Cho et al. | 711/5 |
| 2002/0078270 A1 | * | 6/2002 | Hofstee et al. | 710/23 |
| 2002/0144049 A1 | * | 10/2002 | Mann | 711/5 |

* cited by examiner

Primary Examiner—Mano Padmanabhan
Assistant Examiner—Paul Baker
(74) Attorney, Agent, or Firm—Baker Botts L.L.P.

(57) ABSTRACT

A method and system for controlling an access to a first memory arrangement and a second memory arrangement. The method and system are adapted for controlling access to the first memory arrangement and to the second memory arrangement. A token is passed from a device associated with the first memory arrangement if the access to at least one portion of the first memory arrangement is completed, and the access to the portion of the memory arrangement is disabled. Then, upon a receipt of the token, the access to at least one portion of the second memory arrangement is enabled.

22 Claims, 5 Drawing Sheets

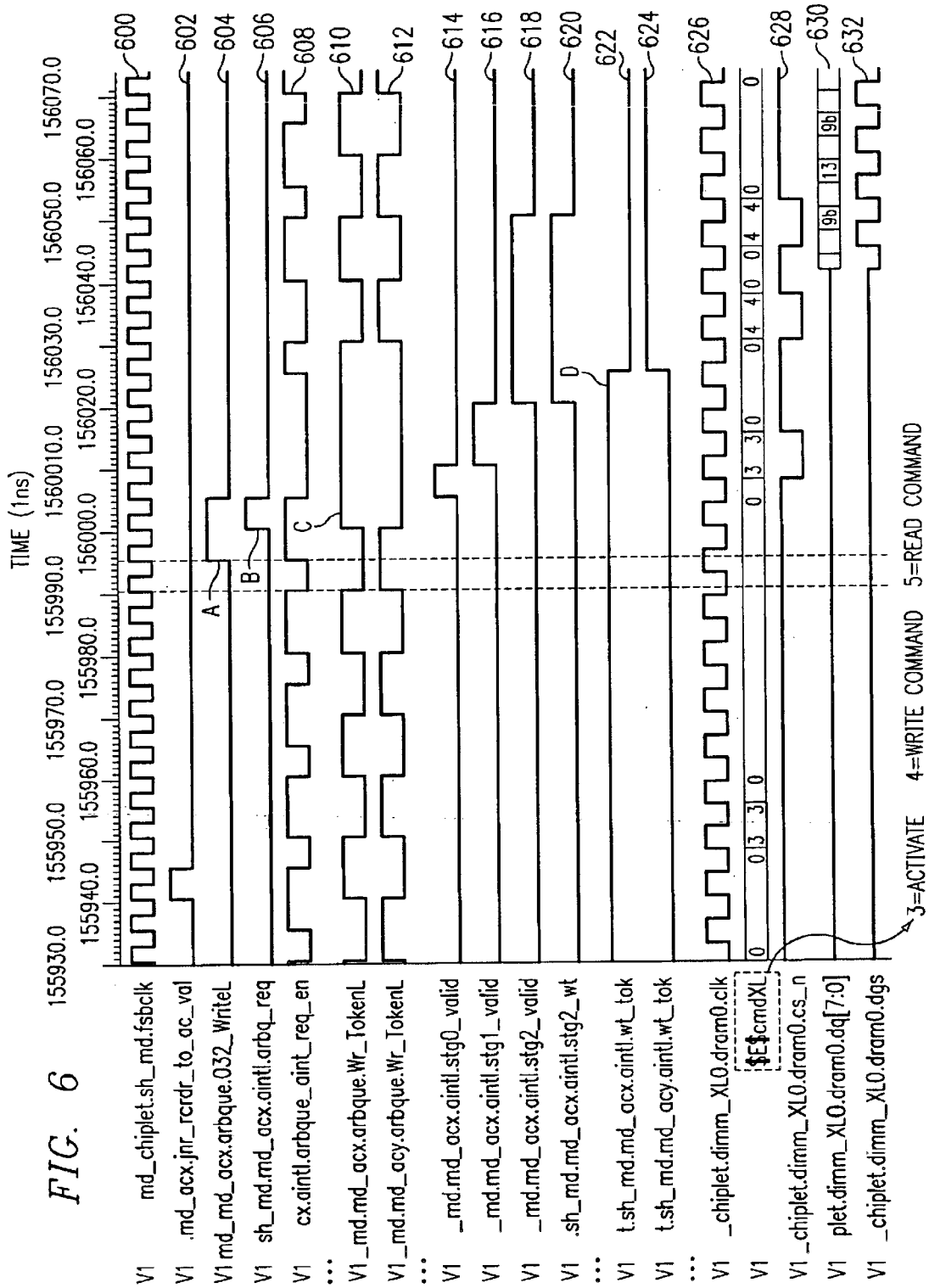

US 6,839,820 B1

METHOD AND SYSTEM FOR CONTROLLING DATA ACCESS BETWEEN AT LEAST TWO MEMORY ARRANGEMENTS

RELATED APPLICATIONS

This application claims the benefit of U.S. Provisional Application Ser. No. 60/219,948 filed Jul. 20, 2000.

FIELD OF THE INVENTION

The present invention relates, in general, to a control of at least two memory arrangements, and more particularly to controlling data access to at least one part of each memory arrangement during a particular time period (e.g., a single clock period), while disabling access to another part of the memory arrangement.

BACKGROUND OF THE INVENTION

In a conventional computer system, data is written into (and read from) a number of memory arrangements via known interfaces. With the current advances in the microprocessor controlling/accessing technology, it is now possible to utilize data busses which provide a large amount of data to the components of the existing computer systems. Thus, current memory arrangements (which are either arranged in or communicating with the computer systems) are now capable of receiving, storing thereon and providing a large amount of data.

With the recent introduction of new processing arrangements (e.g., a non-uniform memory access system or a "NUMA" system), there have been a number of advances to improve the access speed to the conventional memory arrangements. Indeed, because of the operational speed of the processors, it would be disadvantageous to utilize any arrangement (that interacts with the memory arrangements) which would slow down the overall performance of the computing system. Memory access systems are now available which provide the communication to and from the processors at accelerated speeds so as to enable a high throughput of the data. One of the advantages of such high throughput of the data provided with the known memory arrangements is that the time delay for transmitting the data to and from the memory arrangements is substantially diminished.

Two such memory arrangements may be provided for interacting with the processors via respective bus lines. For example, if the processors provide the data to a memory controller, such controller may forward this data to the respective bus line to be accessed by the memory arrangements. Because the access time to these memory arrangements has now been accelerated, the data may be accessed by or provided to both of the memory arrangements simultaneously. If the access to the data is provided at an accelerated rate, and the current draw is too high in the output drivers of the corresponding memory controller of the memory arrangement, an undesirable noise may be introduced into the operation of the computer system. Such noise may cause a signal (which is provided to and received from the memory arrangements) to be captured in a corrupted state. Such occurrence is referred to as a simultaneous switching noise ("SSO").

The SSO may effect the system performance because the excessive noise associated with the SSO can cause a bit error on an interconnect arrangement. In addition, such excessive noise may cause a voltage Vdd (which is provided for powering the bus) to sag, thus resulting in a temporary or even permanent performance degradation on the control circuits of the computer system. Such performance loss can effectuate a timing failure of portions of the computer system, or even the entire computer system.

Thus, the control of the memory arrangements is one of the important features in the computer systems which employ, e.g., the NUMA architectures. According to the present invention (and as described in further detail below), the above-described problems associated with the SSO can be substantially reduced or even eliminated by utilizing an effective memory management scheme. According to an exemplary embodiment of the present invention, it is possible to control the access to the data outputs of the memory arrangements for limiting the simultaneously switching output of these memory arrangements.

SUMMARY OF THE INVENTION

From the foregoing, it may be appreciated that a need has arisen for a scheme to reduce the noise associated with the SSO. In accordance with the present invention, a method and system are provided for enabling and/or disabling access to at least a portion of each memory arrangement during a particular time period, to substantially eliminate or reduce disadvantages and problems associated with the above described conventional computer systems.

According to an embodiment of the present invention, there is provided a method and system for controlling an access to a first memory arrangement and a second memory arrangement. The method and system are adapted for controlling an access to the first memory arrangement and to the second memory arrangement. A token is transmitted (e.g., from a device which may be associated with the first memory arrangement) if the access to at least one portion of the first memory arrangement is completed, and the access to the portion of the first memory arrangement is disabled. Then, upon a receipt of the token by a further device which may be associated with the second memory arrangement, the access to at least one portion of the second memory arrangement is enabled.

In another embodiment of the present invention, the token is transmitted, and the access to the portion of the first memory arrangement is disabled during a predetermined time period (e.g., a single clock period).

In yet another embodiment of the present invention, each of the first and second memory arrangements includes a left side and a right side. In this embodiment, the access to the left side of the first memory arrangement is disabled, and the access to the left side of the second memory arrangement is enabled.

In yet another embodiment of the present invention, the access to the right side of the first memory arrangement is disabled, and the access to the right side of the second memory arrangement is enabled.

In a further embodiment of the present invention, the device is a first controller which is provided to control the access to the portion of the first memory arrangement, and the token is sent by the first controller to the further device which is a second controller. The second controller controls the access to the portion of the second memory arrangement. The first controller disables access to the respective portion of the first memory arrangement, and the second controller enables the access to the respective portion of the second memory arrangement.

In yet another embodiment of the present invention, if the access to the respective portion of the second memory arrangement is completed, the token is passed from the second controller, and the access to the respective portion of the second memory arrangement is disabled by the second controller. Then, upon a receipt of the token at the first controller, the first controller enables the access to the respective portion of the first memory arrangement.

In a further embodiment of the present invention, the access includes a write operation and/or a read operation. In still another embodiment of the present invention, a further token is received from an arbitration queue. This further token is utilized to accelerate a transfer of data to the first memory arrangement, and to determine if there are any gaps in the data.

Other technical advantages may be readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 6 is an example simulation for accessing memory.

DETAILED DESCRIPTION OF THE INVENTION

Figure 1:
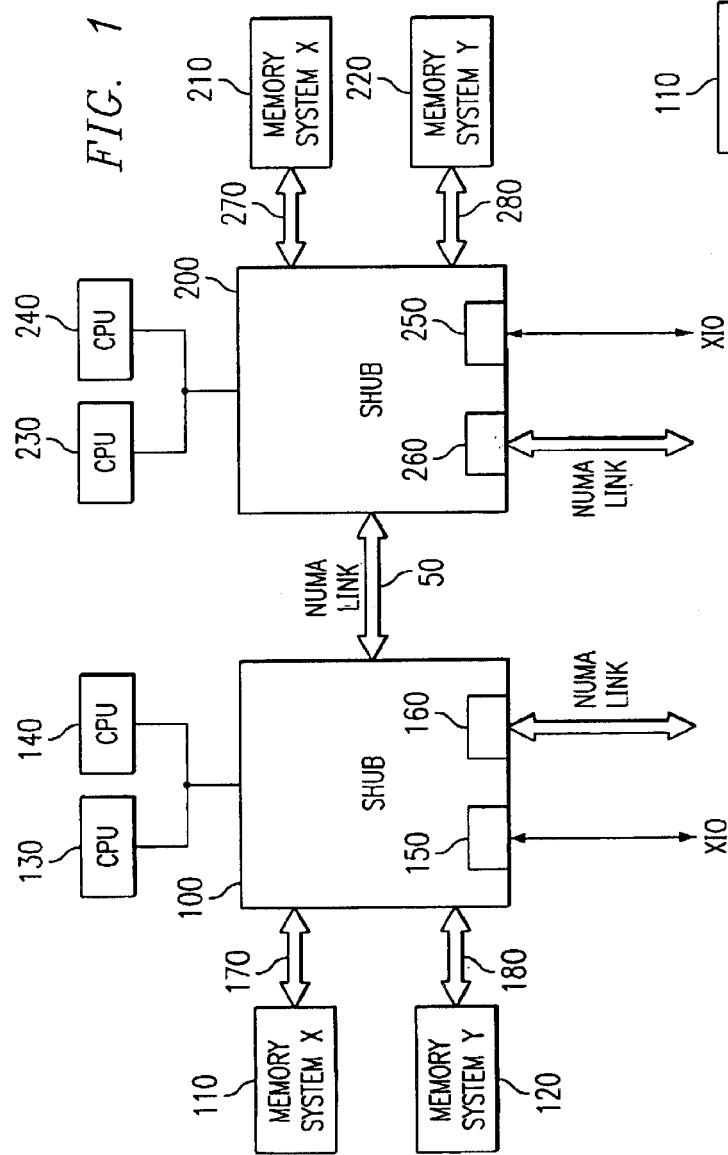
FIG. 1 is a general block diagram illustrating an embodiment of a system according to the present invention.

FIG. 1 shows general block diagram of an exemplary embodiment of an overall system according to the present invention that includes in a first computer system 100 and a second system 200. The first and second systems 100, 200 are interconnected via a NUMA Link 50 (i.e., a non-uniform memory access link). The NUMA Link 50 is capable of carrying data at the rate of, e.g., 3.2 Gigabytes/second. In other embodiments of the present invention, the data can be carried at the rate of 1.6 Gigabytes/second. As illustrated in FIG. 1, each of the first and second systems 100, 200 may include another NUMA connection arrangement 160, 260 for interacting with further systems and arrangements.

The overall system also includes a memory system X 110 and a memory system Y 120, each of which is connected via a respective bus to the first system 100. The second system 200 is also connected to its respective memory systems (i.e., a memory system X 210 and a memory system Y 220). The first system 100 can be connected to two CPUs 130, 140, and the second system 200 can also be connected to two CPUs 230, 240. The CPUs 230, 240, can be different from (or the same as) the CPUs 130, 140. It should be understood that in the NUMA systems such as the one described herein, the CPUs 130, 140 (which are connected to the first system 100) have access to the memory systems X, Y of the second system 200, and the CPUs 230, 240 (connected to the second system 200) have access to the memory systems X, Y of the first system 100. In addition, each of the first and second systems 100, 200 include an XIO communication arrangement 150, 250 for connecting to input/output subsystems. In one exemplary embodiment of the present invention, each respective XIO port allows the data to be carried at the rate of 1.2 Gigabytes/second. In another exemplary embodiment of the present invention, one or both of the XIO communication arrangements 150, 250 can be substituted with a further NUMA communication arrangement to provide the data at an even faster accelerated rate.

Figure 2:
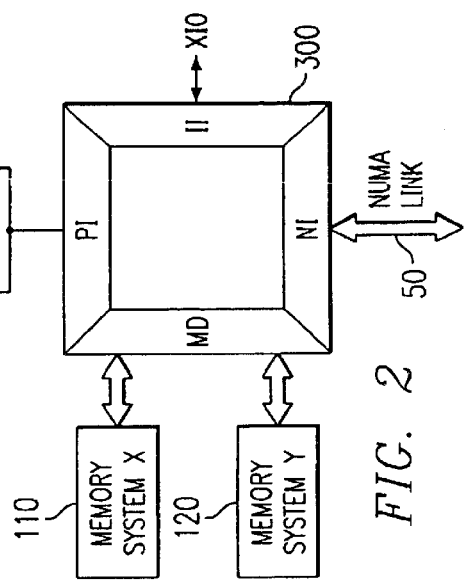
FIG. 2 is a block diagram of a control arrangement of the system shown in FIG. 1.

A detailed illustration of an exemplary embodiment of the first system 100 or the second system 200 according to the present invention is shown in FIG. 2 (which shall be referred to below as a "control arrangement 300" for the sake of clarity). In particular, the control arrangement 300 includes a memory/directory interface MD, a processor interface PI, a network interface NI and a further interface II. The memory/directory interface MD communicates with the respective first and second memory systems X, Y, and interconnects with the processor interface PI. The processor interface PI communicates with the CPUs 130, 140 (or with the CPUs 230, 240). The network interface NI communicates with other systems (e.g., the first system 100 communicating with the second system 200), and the further interface II provides data to the input/output subsystems via the respective XIO communication arrangement 150, 250 arrangement (or via the NUMA communication arrangement). The control arrangement 300 is connected via a first bus 170, 270 to the memory system X, and via a second bus 180, 280 to the memory system Y.

Figure 3:
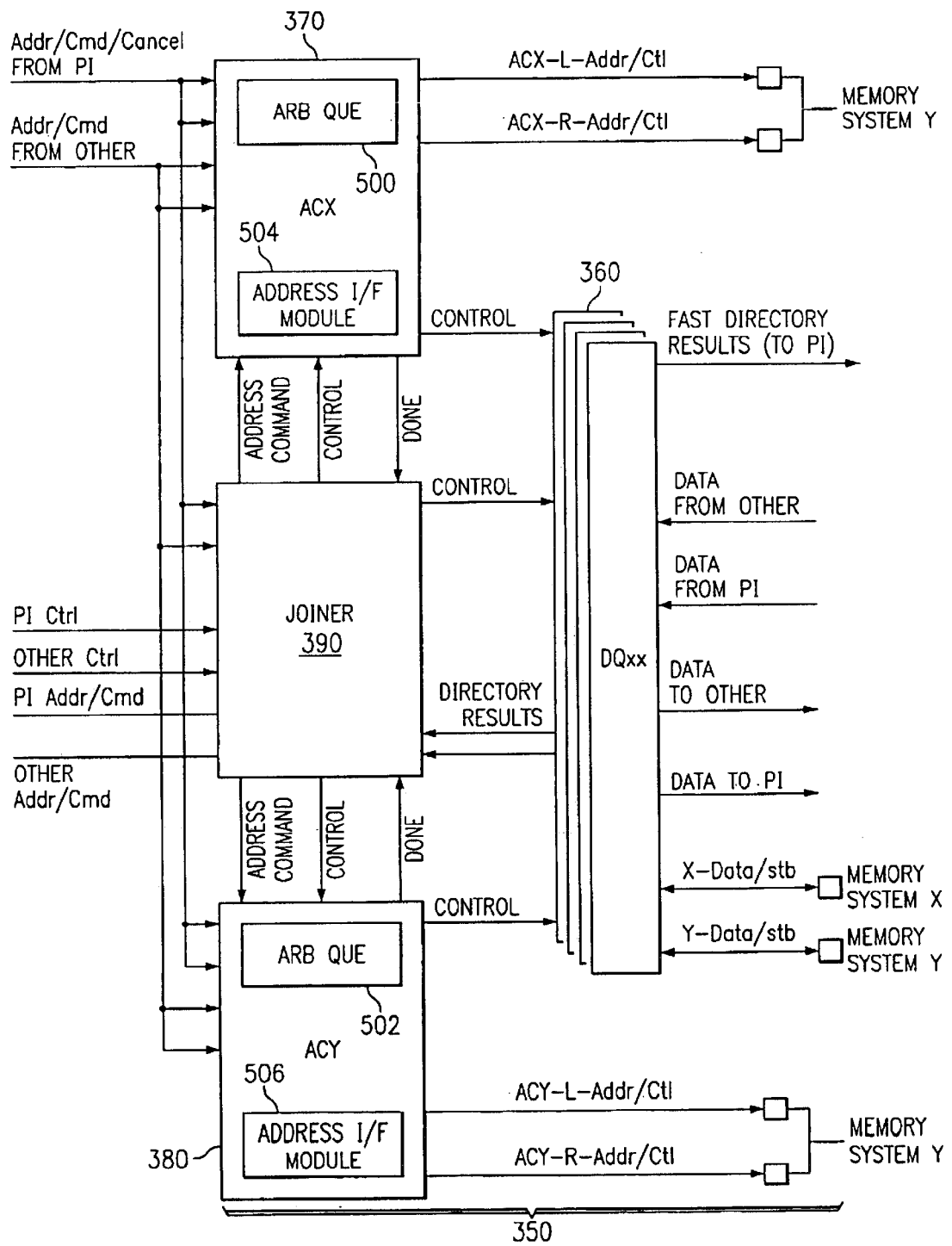
FIG. 3 is a detailed block diagram of a memory/directory interface of the control arrangement shown in FIG. 2.

A detailed illustration of an exemplary embodiment of the memory/directory interface MD is shown in FIG. 3. In this diagram, the memory/directory interface MD 350 is partitioned into seven arrangements, i.e., four data quadrants DQxx 360, a first DRAM address controller ACX 370 (the "X Controller"), a second DRAM address controller ACY 380 (the "Y Controller") and a joiner arrangement 390. The data quadrants 360 exchange data with the memory systems X, Y. The X Controller 370 provides address and control information to dual in-line memory modules ("DIMMs") of the memory system X, while the Y controller 380 provides address and control information to DIMMs of the memory system Y. Other arrows shown in FIG. 3 illustrate exemplary connections of the memory/directory interface MD 350 to further arrangements (e.g., chiplets) of the control arrangement 300.

In the exemplary embodiment of the present invention, each of the data quadrants 360 are capable of handling approximately one fourth of the data path of the memory/directory interface MD 350, and includes approximately one fourth of the Directory Cache RAM. Two of the data quadrants 360 contain a modification logic for the directory entries, and also provide information to the Joiner 390 regarding which messages are to be transmitted. The data quadrants 360 can be subdivided in numerous ways, and the details of such subdivisions are not further discussed herein for the sake of clarity.

An exemplary operation of the memory directory interface MD 350 is described below as it relates to the control of the memory systems X, Y. In particular, each of the memory systems X, Y includes at least one DIMM, and one half of respective DIMM slots are attached to the control arrangement 300. In one exemplary embodiment of the present invention, the X Controller 370 controls the DIMMs of the memory system X that contain even cache line data and odd cache line directory information, while the Y Controller 380 controls the DIMMs of the memory system Y that contain odd cache line data and even cache line directory information. In operation, the X Controller 370 and the Y Controller 380 compare the current address against all cache lines to determine if they have any data thereon. If the cache lines have data thereon, the access to the memory systems X, Y may be delayed. After the availability of the memory system X, Y is established by the respective one of the X Controller 370 and the Y Controller 380, such controller arbitrates among the memory systems X, Y to obtain access thereto.

As discussed above, the memory system X communicates with the control arrangement 300 via the busses 170, 270, and the memory system Y communicates with the control arrangement via the busses 180, 280. Each of the busses connects to a set of four DIMMs. One of the respective memory busses can be referred to as a left bus and the other bus as a right bus. It is also possible that each of the memory busses 170, 180, 270, 280 have a left side and a right side to communicate with the DIMMs of the memory systems X, Y that are connected an the respective left and right sides of the corresponding DIMMs. In such case, two of the data quadrants 360 communicate with the left sides of the memory busses 170, 270 for each of the memory systems X, Y, and the other two of the quadrants 360 communicate with the right sides of busses 180, 280 of each of the memory systems X, Y.

Of the two data quadrants 360 which serve, e.g., the left side of the busses, one may be a primary quadrant since it would, most likely, contain the bulk of the directory logic. The other data quadrant can be considered a secondary quadrant because it contains only a small amount of the directory logic. However, the secondary quadrant may contain more of the data and the directory cache than the primary quadrant. In the exemplary embodiment of the present invention, the secondary quadrant is connected to 40 bits of data from each DIMM on its side (e.g., the left side or the right side), while the primary quadrant connects only to 32 bits of the data.

For example, the four data quadrants are identified as follows. The letters L (left) and R (right) are therefore included to name the data quadrants 360, and the letters P (primary) and S (secondary) are also included in the names, which are as follows:

a. DQLP—(primary quadrant) handles the left side directory logic and 32 bits of the left side data path for each of the memory systems X, Y.

b. DQLS—(secondary quadrant) handles 40 bits of the left side data path for each of the memory systems X, Y.

c. DQRP—(primary quadrant) handles the right side directory logic and 32 bits of the right side data path for each of the memory systems X, Y.

d. DQRS—(secondary quadrant) handles 40 bits of the right side data path for each of the memory systems X, Y.

In the exemplary embodiment of the system and method of the present invention, the memory/directory interface MD preferably has at least four arbitration points. Two of the arbitration points (e.g., the memory arbitration queues) are provided for a DRAM arbitration with respect to the memory system X and the memory system Y. These arbitration points may be substantially similar or even identical. A third arbitration point is referred to as a "Sender". The Sender transmits replies in response to the incoming requests. In another embodiment, the Sender may also transmit the requests. The fourth arbitration point (or an arbiter) is a "Record" arbiter which can be used for the memory systems X, Y. These memory systems X, Y generally accept one new operation per cycle, and the Joiner 390 (using the Record arbiter) selects to which of the systems of the control arrangement 300 the incoming new operations requests are to be transmitted.

The control arrangement 300 provides an arbitration queue ("ArbQue") for facilitating two of the above-described arbitration points. This ArbQue is provided, e.g., to arbitrate the data transactions being received in the directory cache. In addition, the control arrangement 300 facilitates four write-back queues thereon, one for each of the four busses. Each of the X Controller 370 and the Y Controller 380 uses a memory arbitration queue to determine which of the memory system X or the memory system Y (and/or left or right sides thereof which are connected to the left and right busses, respectively) are enabled for writing data thereon, i.e., the last two arbitration points or the Record arbiter described above. These memory arbitration queues can also be utilized for determining which of the memory systems X, Y can provide data to the CPUs via the control arrangement 300.

Each of the memory system X and the memory system Y has two sides (i.e., the left side and the right side), and both sides of each provide access to 72 bits thereof. This exemplary configuration is provided to facilitate a reduction of the noise associated with the simultaneous switching output ("SSO") as discussed in further detail below. In addition, the above-described configuration of the memory systems X, Y enables the sharing of the data connections of the memory systems X, Y with other systems (e.g., the CPUs).

To prevent or lessen the problems associated with the SSO, it is preferable to allow only a particular portion of data outputs of the memory systems X, Y to be active during a particular period of time (or at any one point in time). Indeed, it is disadvantageous to allow the data outputs to be switched in the same direction (to allow a "write" access) simultaneously since the noise associated with the SSO may be generated. In one exemplary embodiment of the present invention, half of the outputs of the memory systems X, Y remain active at any one time, while the other half are maintained as inactive. As discussed above, the memory arbitration queues (and/or the arbitration points, e.g., the record arbiter) which may be provided on each of the X Controller 370 and the Y Controller 380, are used to arbitrate (or sequence) the requests between their associated memory systems X, Y. To obtain access to one of the memory systems 100, a request for enabling the data outputs must be received by the memory directory interface. The request that wins the arbitration phase is sent to control modules (i.e., the X controller and/or the Y controller). These control modules generate an appropriate signal to either enable the outputs of respective DIMMs of one of the memory systems X, Y, or disable the outputs of the respective DIMMs, as described in greater detail below.

Figure 4:
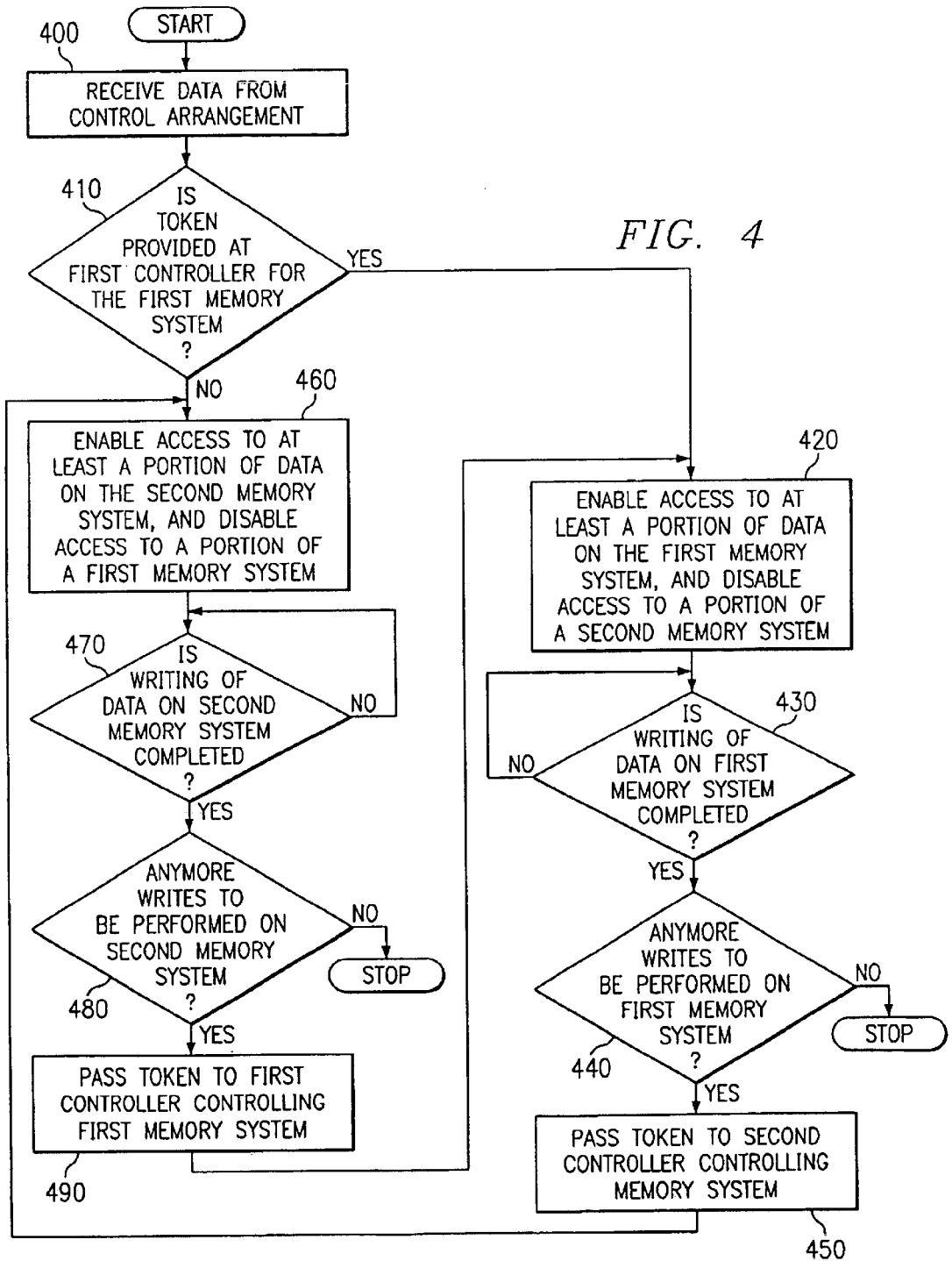
FIG. 4 is an exemplary implementation of the method according to the present invention in which a write access is controlled for at least one part of each memory system connected to the memory/directory interface of FIG. 3.

FIG. 4 shows an exemplary implementation of the system and method according to the present invention in which access (e.g., a write access) is enabled only to one of the memory systems X, Y and/or portions thereof, and disabled to the other area of the memory systems X, Y. In step 400, the data is received from the control arrangement 300. Then, in step 410, it is then determined if the token is provided to a first controller (e.g., the X Controller) which controls a first memory system (e.g., the memory system X). If so, access to the data outputs of the first memory system is enabled, and at least some of the data is provided to these data outputs (step 420). At that time (or within a predetermined time period), access to the data outputs of a second memory system (e.g., the memory system Y) are disabled. Thereafter, in step 430, it is determined if the data is still being written into the first memory system. If so, the process continues until the writing of the data into the first memory system is completed, or if a timeout occurs. Otherwise (when the writing of the data into the first memory system has been completed or the timeout has occurred), it is determined if any more write operations have been requested (step 440). If not, this process is completed; otherwise, in step 450, the token is passed to a second controller (e.g., the Y Controller) which controls the second memory system, and the process is forwarded to step 460. Also, if in step 410 it is determined that the token is not provided at the first controller, the execution is forwarded to step 460.

In step 460, the access to the data outputs of the second memory system is enabled, and at least some of the data are provided to these data outputs. At that time (or within a predetermined time period) the access to the data outputs of the first memory system are disabled. Thereafter, in step 470, it is determined if the data is still being written into the second memory system. If so, the process continues until the writing of the data into the second memory system is completed, or if a timeout occurs. Otherwise (i.e., when the writing of the data into the second memory system has been completed or the timeout has occurred), it is determined if any more write operations have been requested (step 480). If not, this process is completed; otherwise, in step 490, the token is passed to the first controller, and the execution is forwarded to step 420.

In summary, the exemplary embodiment of the system and method according to the present invention enables the data outputs of the particular memory system preferably when the controller that controls such memory system receives the token from another system or controller. In this embodiment, the data outputs of the entire memory system can be selectively enabled or disabled.

In another exemplary embodiment of the system and method according to the present invention, only a subset of the data outputs of the memory system are selectively enabled and/or disabled using the above-described scheme. As indicated above, each of the memory systems X, Y can include the left side (e.g., associated with the left bus) and the right side (e.g., associated with the right bus). Thus, it is possible to allow the data outputs of the left side of the memory system X or the left side of the memory system Y to become active, but not both. Similarly, only the right side of the memory system X or the right side of the memory system Y can be active at any one time, but not both.

One having ordinary skill in the art would recognize that many of the steps described above can be implemented in parallel or in a different order. For example, the series of steps 420–450, as well as steps 460–490 can be executed in a different order. In addition, steps 420–450 and steps 460–490 can be executed in parallel.

In yet another embodiment of the system and method according to the present invention, it is possible to utilize two tokens for determining whether a particular memory system should be enabled or disabled. Particularly, an address interface (e.g., the memory/directory interface MD) may generate and/or transmit a first token, while the ArbQue may provide a second token. The first token can be used to enable or disable the access to the data outputs and/or writes of the particular memory system (or subsets thereof), while the second token can be used by the control arrangement 300 to expedite the transfer of the data, determine the next course of action, and/or establish if there are any gaps in the data.

Figure 5:
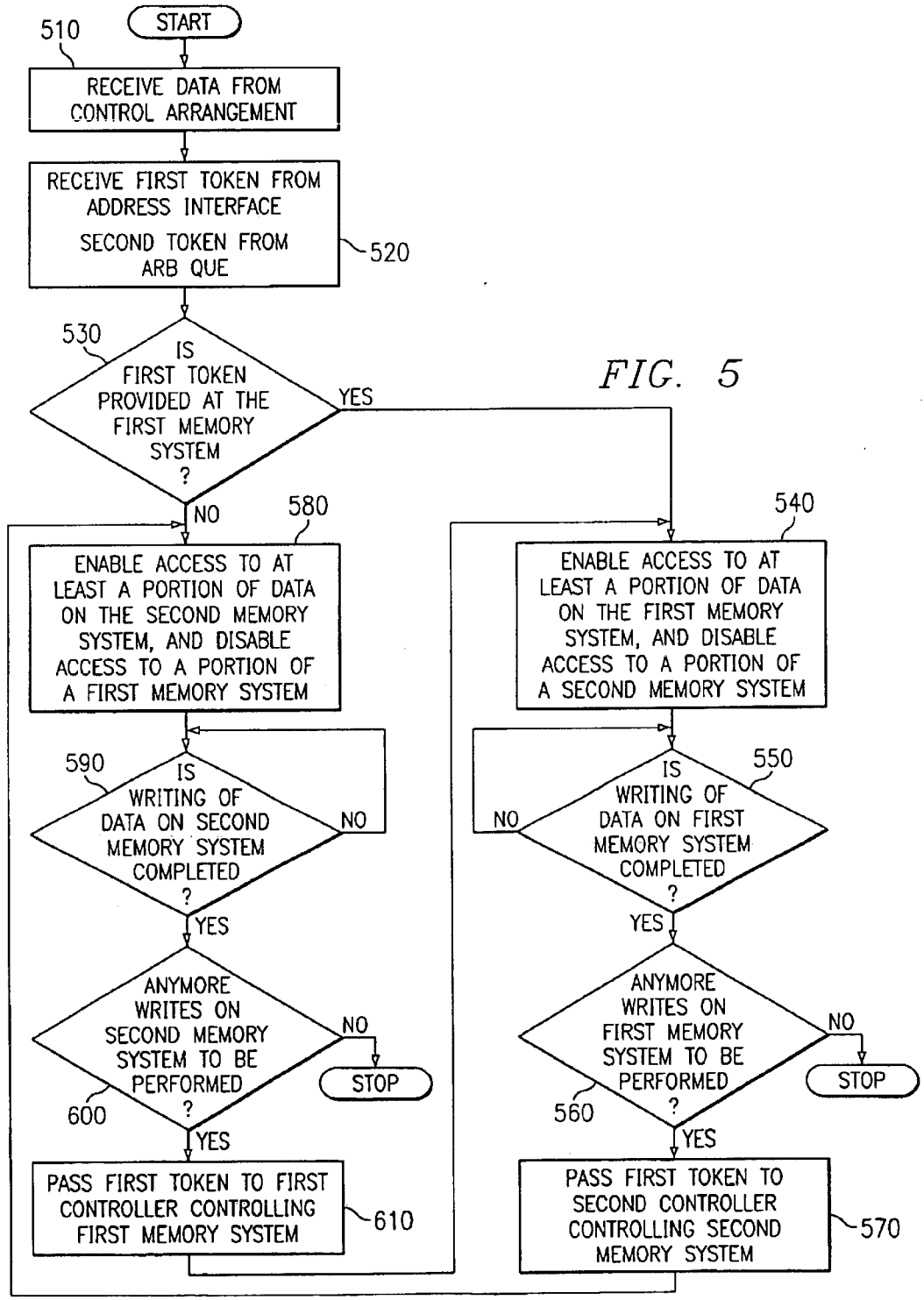
FIG. 5 is another exemplary implementation of the method according to the present invention.

FIG. 5 shows this exemplary scheme of the system and method according to the present invention in which the access (e.g., the write access) is enabled only to one of the memory systems X, Y and/or portions thereof, and which uses the two-token scheme described above. In step 510, the data is received from the control arrangement 300. Then, in step 520, a first token is transmitted by the address interface (e.g., the memory/directory interface MD), and a second token is transmitted by the ArbQue. It is then determined if the first token is provided to the first controller which controls the first memory system, in step 530. If so, the access data outputs of the first memory system is enabled, and at least some of the data is provided to these data outputs (step 540). At that time (or within a predetermined time period), the access to the data outputs of a second memory system (e.g., the memory system Y) are disabled. Thereafter, in step 550, it is determined if the data is still being written into the first memory system. If so, the process continues until the writing of the data into the first memory system is completed, or if the timeout occurs. Otherwise (when the writing of the data into the first memory system has been completed or if the timeout has occurred), it is determined if any more write operations have been requested (step 560). If not, this process is completed; otherwise, in step 570, the first token is passed to the second controller (e.g., the Y controller) which controls the second memory system, and the process is forwarded to step 580. Also, if in step 530 it is determined that the first token is not provided at the first controller (e.g., the X controller) which controls the first memory system, the execution is forwarded to step 580.

In step 580, the access to the data outputs of the second memory system is enabled, and at least some of the data is provided to these data outputs. Thereafter, in step 590, it is determined if the data is still being written into the second memory system. If so, the process continues until the writing of the data into the second memory system is completed, or if a timeout occurs. Otherwise (when the writing of the data into the second memory system has been completed or the timeout has occurred), it is determined if any more write operations have been requested (step 600). If not, this process is completed; otherwise, in step 610, the token is passed to the first controller and the execution is forwarded to step 540.

It should be understood that the exemplary schemes described above with reference to FIGS. 4 and 5 can be implemented for the memory systems X, Y and/or for other memory systems (situated local to or remote from the controller arrangement 300).

In a two token implementation, a first write token may be passed between an ArbQue 500 of X Controller 370 and Arbque 502 of Y Controller 380 to provide a coarse tuning stage access to the data outputs of the appropriate DIMM. A second write token may be passed between an Address I/F Module 504 of X controller 370 and an Address I/F Module 506 of Y Controller to provide a fine tuning stage access to the data outputs of the appropriate DIMM down to a specific clock period. Each of ArbQue 500 and 502 arbitrates among their respective requests. Upon availability within Address I/F Module 504 and 506, requests that win arbitration are passed to the respective Address I/F Modules 504 and 506. Address I/F Modules 504 and 506, when in possession of the second write token, begin sequencing the appropriate DIMM according to the DIMM specifications to perform the next request. Address I/F Modules 500 and 502 may first activate the appropriate DIMM, wait a number of clock periods to ensure that previous requests have been processed and are off the bus, and then process the next request. Each of ArbQue 500 and 502 operates to minimize bus turnaround times by grouping read and write requests so that a string of read requests or a string of write requests may be performed in a bundle for maximum memory performance.

Write requests in ArbQue 500 for example will stall until all of the memory related conflicts such as bank busy, bus turn around, et al. have been resolved and it has obtained the first write token. Once ArbQue 500 has the first write token and valid write requests, it will hold on to the first write token to cycle through as many write requests as possible to minimize the number of write-to-read and read-to-write turn arounds. After a programmable number of successive write requests (for example, 16, 32, or 64), ArbQue 500 will relinquish the first write token to ArbQue 502. Address I/F Module 504 receives write requests from ArbQue 500, cycles according to the DRAM specifications of the appropriate DIMM and, if it doesn't have it, requests the second write token from Address I/F Module 506. If it does have the second write token, Address I/F Module 504 will hold on to it and issue the DRAM command phase when all bus turn around conflicts have been resolved. Write requests are thenn issued to the particular DRAM of the appropriate DIMM. Once Address I/F Module 504 issues the DRAM command phase, it passes the second write token back to Address I/F Module 506 if it is being requested. If Address I/F Module 506 is not requesting the second write token, Address I/F Module 504 will hold onto the second write token.

FIG. 6 shows a simulation of how the two token implementation operates. The simulation shows a core clock signal 600, a joiner valid signal 602, a write request present signal 604, a request accept signal 606, and a request transfer signal 608. An X token one signal 610 and a y token one signal 612 show the passing of the first token between ArbQues 500 and 502. Stage zero signal 614, stage one signal 616, stage two signal 618, and memory issue signal 620 show the staging of the write request through Address I/F Module 504 and subsequent issuance to the appropriate DIMM. An x token two signal 622 and a y token two signal 624 show the passing of the second token between Address I/F Modules 504 and 506. A dram clock signal 626, a dram chip select signal 628, a dram data signal 630, and a dram data select signal 632 show the interfaces to a particular memory unit within the appropriate DIMM.

At point A, write request present signal 604 indicates that a write request has been successfully arbitrated by ArbQue 500. At point B, Address I/F Module 504 asks for the next request from ArbQue 500. ArbQue 500 sees that it has the first write token at point C and passes the write request to Address I/F Module 504 through request transfer signal 608. ArbQue 500 holds onto the first write token until the transfer of the write request is completed. Within Address I/F Module 504, the write request is staged prior to issuance to memory. Upon entering Address I/F Module 504 as indicated by stage zero signal 614, the particular DRAM device in the appropriate DIMM is activated by dram chip select signal 628. Upon reaching stage two as indicated by stage two signal 618 and having the second write token at point D, Address I/F Module issues the write request to memory and then releases the second token. The dram chip select signal 628 enables the particular DRAM device in the appropriate DIMM with a write command and the data is written into memory through dram data signal 630 and dram data select signal 632.

The above described embodiments of the present invention prevent the simultaneous access to the outputs of the respective memory systems. The two stage operation of arbitration and token transfer ensures that access to outputs of only one memory system occur at any given time. Accordingly, the noise which is generally associated with the SSO is at least reduced or even eliminated. Advantageously, the Vdd sag caused by the noise associated with the SSO is reduced, which then improves the overall performance of the control arrangement 300, and reduces the possible timing failures. The system and method according to the present invention can also enable or disable the access to a particular memory system within a single clock period.

Thus, it is apparent that there has been provided, in accordance with the present invention, a method and system for enabling or disabling access to at least a part of each of the memory systems during a particular time period that satisfies at least some of the advantages set forth above. Although the present invention has been described in detail, it should be understood that various changes, substitutions, and alterations may be readily ascertainable by those skilled in the art, and may be made herein without departing from the spirit and scope of the present invention as defined by the following claims.

What is claimed is:

1. A method for controlling access to a first memory arrangement and a second memory arrangement, comprising the steps of:
   passing a token if access to at least one portion of the first memory arrangement is completed;
   after the passing step, disabling the access to the at least one portion of the first memory arrangement; and
   upon a receipt of the token, enabling access to at least one portion of the second memory arrangement.

2. The method according to claim 1, wherein the passing and enabling steps are performed during a predetermined time period.

3. The method according to claim 2, wherein the predetermined time period is a single clock period.

4. The method according to claim 1, wherein the first memory arrangement includes a left side and a right side, and wherein the second memory arrangement includes a left side and a right side.

5. The method according to claim 4, wherein the disabling step is performed by disabling the access to the left side of the first memory arrangement, and wherein the enabling step is performed by enabling the access to the left side of the second memory arrangement.

6. The method according to claim 4, wherein the disabling step is performed by disabling the access to the right side of the first memory arrangement, and wherein the enabling step is performed by enabling access to the right side of the second memory arrangement.

7. The method according to claim 1, wherein the passing step comprises sending the token by a first controller to a second controller, the first controller controlling the access to the first memory arrangement, the second controller controlling the access to the second memory arrangement.

8. The method according to claim 7, wherein the first controller disables the access to the at least one portion of the first memory arrangement, and the second controller enables the access to the at least one portion of the second memory arrangement.

9. The method according to claim 7, further comprising the steps of:
   if the access to the at least one portion of the second memory arrangement is completed, passing the token by the second controller;
   after the token is passed by the first controller sending step, disabling the access to the at least one portion of the second memory arrangement by the second controller; and upon a receipt of the token at the first controller, enabling the access to the at least one portion of the first memory arrangement.

10. The method according to claim 1, wherein the access includes a write operation.

11. The method according to claim 1, wherein the access includes a read operation.

12. The method according to claim 1, further comprising the steps of:
   receiving a further token from an arbitration queue; and
   utilizing the further token to perform at least one of the following operations:
      accelerating a transfer of data to the first memory arrangement, and
      determining if gaps exist in the data.

13. A system for controlling access to a first memory arrangement and a second memory arrangement, comprising:
   a first controller controlling access to at least one portion of the first memory arrangement; and
   a second controller controlling access to at least one portion of the second memory arrangement,
   wherein the first controller passes a token to the second controller if the access to the at least one portion of the first memory arrangement is completed, and disables the access to the at least one portion of the first memory arrangement, and
   wherein, upon a receipt of the token, the second controller enables the access to the at least one portion of the second memory arrangement.

14. The system according to claim 13, wherein the first controller passes the token, and enables the access to the at least one portion of the first memory arrangement during a predetermined time period.

15. The system according to claim 14, wherein the predetermined time period is a single clock period.

16. The system according to claim 13, wherein the first memory arrangement includes a left side and a right side, and wherein the second memory arrangement includes a left side and a right side.

17. The system according to claim 16, wherein the first controller disables the access to the at least one portion of the first memory arrangement by disabling the access to the left side of the first memory arrangement, and wherein the second controller enables the access to the at least one portion of the second memory arrangement by enabling the access to the left side of the second memory arrangement.

18. The system according to claim 16, wherein the first controller disables the access to the at least one portion of the first memory arrangement by disabling the access to the right side of the first memory arrangement, and wherein the second controller enables the access to the at least one portion of the second memory arrangement by enabling the access to the right side of the second arrangement.

19. The system according to claim 13, wherein, if the access to the at least one portion of the second memory arrangement is completed, the second controller passes the token from the second controller to the first controller, and disables the access to the at least one portion of the second memory arrangement, and
   wherein the first controller enables the access to the at least one portion of the second memory arrangement upon a receipt of the token from the second controller.

20. The system according to claim 13, wherein the access includes a write operation.

21. The system according to claim 13, wherein the access includes a read operation.

22. The system according to claim 1, further comprising:
   a third controller receiving a further token from an arbitration queue, and utilizing the further token to perform at least one of the following operations:
      accelerating a transfer of data to the first memory arrangement, and
      determining if gaps exist in the data.

* * * * *